Sept. 5, 1950            C. W. SINCLAIR            2,521,260
WHEEL
Filed Dec. 6, 1948                                    2 Sheets-Sheet 1
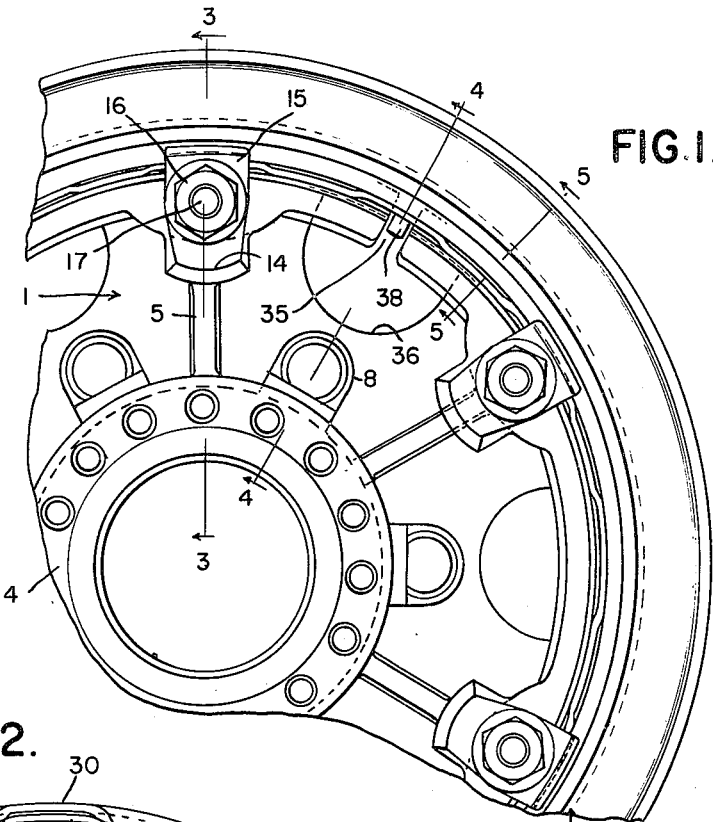
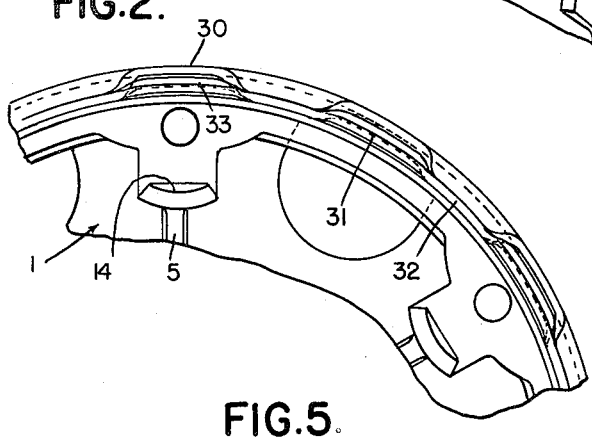
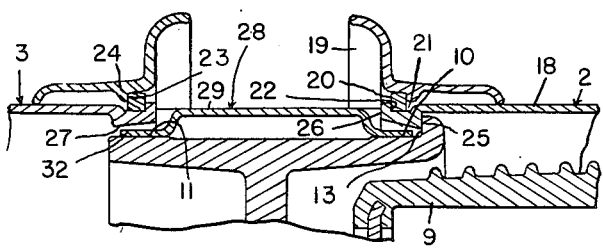
INVENTOR.
CHARLES W. SINCLAIR
BY
ATTORNEYS Sept. 5, 1950             C. W. SINCLAIR             2,521,260
WHEEL
Filed Dec. 6, 1948                             2 Sheets-Sheet 2
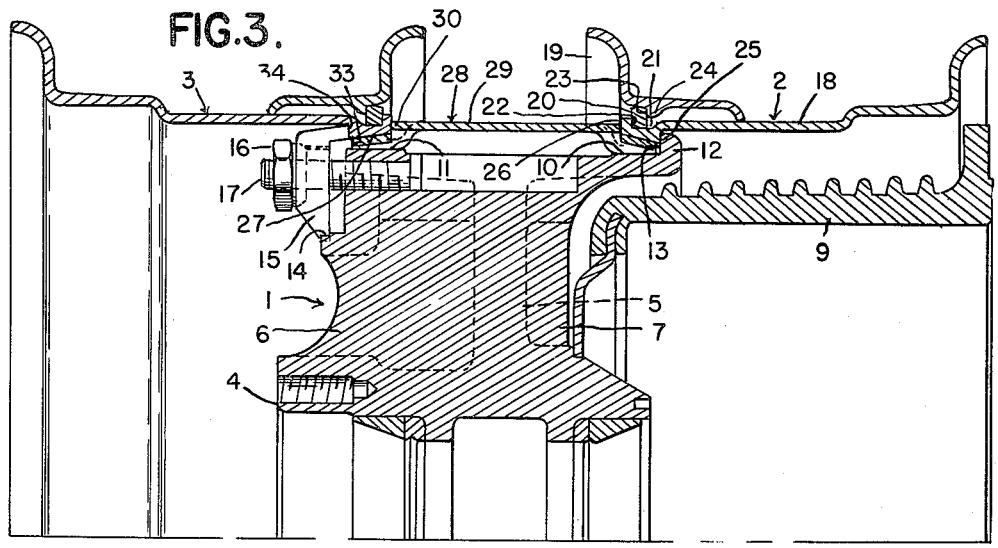
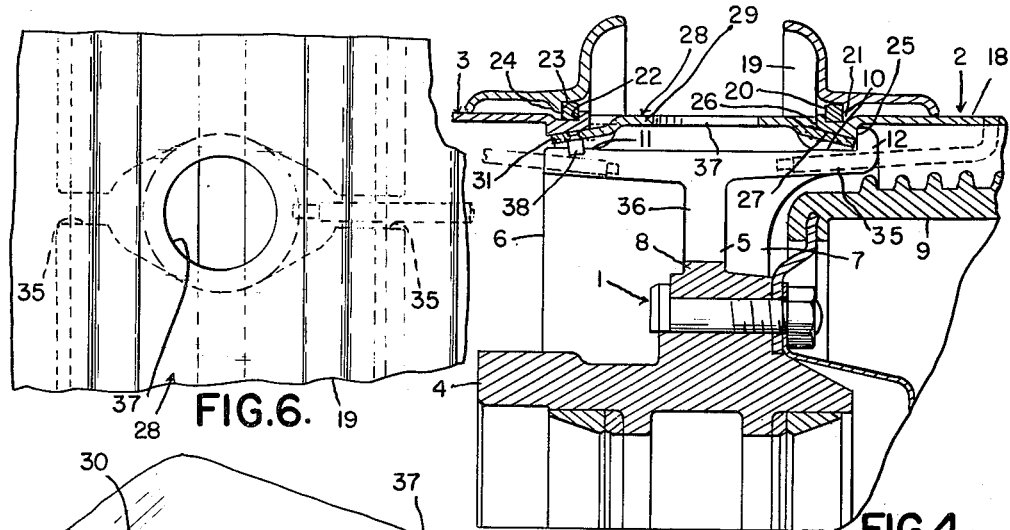
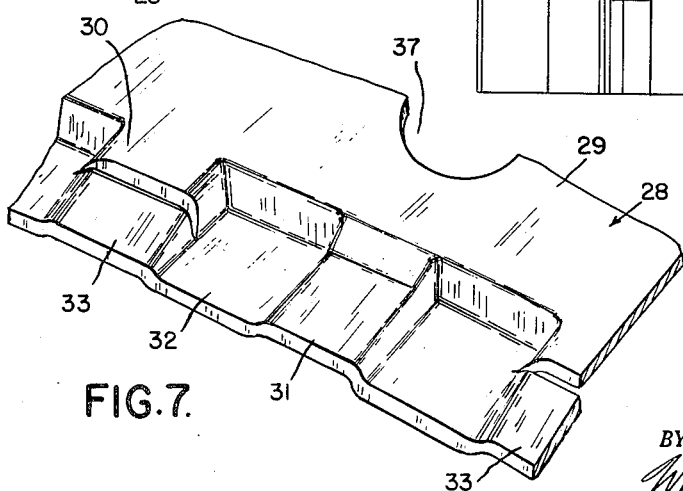
INVENTOR.
CHARLES W. SINCLAIR
BY
ATTORNEYS Patented Sept. 5, 1950

2,521,260

UNITED STATES PATENT OFFICE 2,521,260

WHEEL

Charles W. Sinclair, Detroit, Mich., assignor to Kelsey-Hayes Wheel Company, Detroit, Mich., a corporation of Delaware Application December 6, 1948, Serial No. 63,769

13 Claims. (Cl. 301—13)

The invention relates to wheels and refers more particularly to vehicle wheels of the demountable rim type.

The invention has for one of its objects to provide a dual demountable rim wheel in which the rims may be readily mounted on the wheel body and secured in proper alignment at right angles to the axis of the wheel.

The invention has for another object to provide an improved construction of spacer between the rims having means for exerting axial pressure on the rims and other means engageable with the rims and wheel body for transmitting radial load.

The invention has for a further object to provide a simple construction of rim designed to cooperate with the wheel body and the means for securing the rim on the wheel body.

With these and other objects in view, the invention resides in the novel features of construction and combinations and arrangements of parts as more fully hereinafter set forth.

In the drawings:

Figure 1 is a side elevation of a portion of a wheel embodying the invention;

Figure 2 is a similar view with parts removed;

Figures 3, 4 and 5 are cross sections on the lines 3—3, 4—4 and 5—5 respectively of Figure 1;

Figure 6 is a peripheral view of a portion of the wheel; and

Figure 7 is a perspective view of a portion of the spacer between the rims.

As shown in Figures 1–7 inclusive, the wheel is of the dual demountable rim type having the wheel body 1 and the inboard and outboard tire carrying rims 2 and 3 respectively, detachably mounted on the wheel body. The wheel body, as illustrated, is formed of cast metal and has the hub 4, the radial web 5 and the axial reinforcements 6 and 7 extending respectively in outboard and inboard directions from the web. The wheel body also has extending radially outwardly from its hub the bosses 8 between the axial reinforcements 6 and 7 for attaching the brake drum 9 to the wheel body. The wheel body has at its periphery the circumferentially extending inboard and outboard ledges 10 and 11 respectively, and the circumferentially extending inboard radial flange 12 which extends from the inboard edge of the ledge 10 and provides the substantially radial shoulder 13 facing axially in an outboard direction with its plane at right angles to the axis of the wheel body. The wheel body is further provided with the arcuate abutments 14 at the outboard sides of the axial reinforcements 6 for the rim clamps 15 which are adjustable by means of the nuts 16 rotatably secured to the clamps and threaded on the bolts 17 which latter are non-rotatably secured to the wheel body.

The tire carrying rims 2 and 3 are alike, each being formed of the endless base member 18, the endless tire retaining member 19 and the transversely split clamping ring member 20 located between the base member and the tire retaining member. More particularly, the clamping ring member is located between the base member and the tire retaining member. More particularly, the clamping ring member is located within the annular gutter 21 formed at one edge of the base member and abuts the substantially radial annular shoulder 22 formed by the outer wall of the gutter and the substantially radial annular shoulder 23 formed by the radially inwardly extending annular bead 24 on the tire retaining member. Furthermore, the clamping ring member has a wedging engagement with the tire retaining member and the construction is such that when the parts are in their assembled positions the clamping ring member exerts radial pressure on both the base member and the tire retaining member tending to radially flex the same. The gutter of the base member is formed with the circumferentially extending axially facing substantially radial annular surface 26 and the circumferentially extending annular radially inner surface 27 flared in the direction away from the shoulder 25 and toward the axially facing surface 26.

The rims 2 and 3 are reversibly mounted on the wheel body with the inboard rim 2 positioned so that its shoulder 25 engages the shoulder 13 of the wheel body and is thereby positioned and properly aligned so that its plane of rotation is at right angles to the axis of the wheel body. For clamping the rim 2 in place and axially positioning and properly aligning the rim 3 upon the wheel body when the clamps 15 are secured in place, there is the annular spacer 28 between the rims and the rims and wheel body. The spacer is a ring preferably transversely split at one point only in its circumference and is formed of sheet steel to be inherently resilient. The spacer has the annular body 29, the axially extending circumferentially or angularly spaced extensions 30 at the opposite ends and in the plane of the body, the axially extending circumferentially or angularly spaced flexible resilient rim seat portions 31 also at the opposite ends of the body, the axially extending flexible resilient wheel body engaging portions 32 between the extensions 30 and the rim seat portions 31 and the flexible resilient rim seat portions 33 beyond the ends of the extensions 30 and between the wheel body engaging portions 32. The rim seat portions 31 and 33 and the wheel body engaging portions 32 are in the nature of bosses or ribs and the radially outer surfaces of the rim seat portions 31 and 33 at the opposite ends of the body taper away from each other and are inclined at substantially the same angle as and engage the flared radially inner surfaces 27 of the rims. It will be noted that the radially outer surfaces are radially inwardly offset relative to the extensions 30, the rim seat portions 33 being sheared from the extensions 30 so that the ends of these extensions extend radially and are exposed radially outwardly of the rim seat portions. The wheel body engaging portions 32 have axially extending radially inner surfaces radially inwardly offset beyond the rim seat portions for engaging the radially outer axial surfaces of the ledges 10 and 11 of the wheel body. The ends of the extensions 30 which axially abut the axially facing substantially radial surfaces 26 of the rims are in the same plane of rotation at each end of the body 29 and the ends of the extensions at one end of the body are spaced from the ends of the extensions at the other end of the body a predetermined distance to predeterminedly space the rims from each other.

It will be noted that the clamps 15 haxe axially facing substantially radial faces 34 for abutting the substantially radial shoulder 25 of the outboard rim so that upon tightening the nuts of the clamps they act through the gutter of the outboard rim which in turn acts upon the annular spacer to positively position and align the inboard rim with its plane of rotation at right angles to the axis of the wheel and then positively position and properly align the outboard rim upon the wheel body, the substantially radial shoulder 25 of the wheel body serving in the positioning of the inboard rim and the spacer then serving in the positioning of the outboard rim. By reason of the rim seat portions and wheel body engaging portions of the spacer being flexible and resilient, the axial positioning of the rims is secured and at the same time the spacer takes care of the radial load between the wheel body and rims.

To provide for assembly of the wheel rims with the pneumatic tires mounted thereon on the rim, the ledges 10 and 11 of the wheel body are formed with the axially aligned slots 35 and the intermediate portion of the wheel body is recessed so that the valve stems of the tires on the inboard and outboard rims may be accommodated while assembling or removing the rims on or from the wheel body. The web of the wheel body is formed with the holes 36 between the axial reinforcements 6 and 7, one of these holes registering with the slots 35, so that access may be had to the valve stems for inflating the tires. The annular spacer 28 is formed with the circumferentially or angularly spaced holes 37 through its body which provide for circulation of air between the rims and the tires thereon and to properly position the spacer on the wheel body there is the pin or dowel 38 secured to one of the outboard rim seat portions of the spacer and extending into the axial valve stem receiving slot in the outboard ledge 11 of the wheel body.

The present application is a continuation-in-part of my copending application Serial No. 34,217 filed June 21, 1948, entitled "Wheel," now abandoned.

What I claim is:

1. A dual demountable rim wheel comprising a wheel body having a circumferentially extending substantially radial shoulder at its periphery, a pair of tire carrying rims each having a circumferentially extending substantially radial shoulder, a circumferentially extending axially facing substantially radial surface and a circumferentially extending radially inner surface flared in a direction away from the shoulder and toward the axially facing surface of the rim, an annular spacer having substantially radial surfaces abutting the axially facing surfaces of said rims and securing the shoulder of one of said rims against the shoulder of said wheel body, said spacer having flexible portions abutting the flared surfaces of said rims for carrying the radial load of said wheel body to said rims, and means abutting the shoulder of the other of said rims for securing said rims and spacer on said wheel body.

2. A dual demountable rim wheel comprising a wheel body having a circumferentially extending substantially radial shoulder at its periphery, a pair of tire carrying rims each having a circumferentially extending substantially radial shoulder, a circumferentially extending axially facing substantially radial surface and a circumferentially extending radially inner surface, an annular spacer abutting the axially facing surfaces of said rims and securing the shoulder of one of said rims against the shoulder of said wheel body, said annular spacer having resilient portions between said radially inner surfaces of said rims and said wheel body, and means abutting the substantially radial shoulder of the other of said rims for securing said rims and spacer on said body.

3. A dual demountable rim wheel comprising a wheel body having a circumferentially extending substantially radial shoulder at its periphery, an annular spacer having an annular body with substantially radially extending surfaces at its ends and also having radially flexible rim seat portions encircling said wheel body, a pair of tire carrying rims engaging and flexing the seat portions of said spacer and axially abutting said substantially radially extending surfaces of said spacer, each of said rims having a circumferentially extending substantially radial shoulder with the shoulder of one rim against the shoulder of said wheel body, and means abutting the shoulder of the other of said rims for securing said rims and spacer on said wheel body.

4. A dual demountable rim wheel comprising a wheel body having a circumferentially extending substantially radial shoulder, a pair of tire carrying rims each having a circumferentially extending substantially radial shoulder, spacing means between said rims having axial abutting engagement therewith for securing the shoulder of one of said rims against the shoulder of said wheel body, said spacing means also having circumferentially extending radially flexible load carrying means in radial engagement with said wheel body and rims, and clamping means on said wheel body engageable with the shoulder of the other of said rims for securing said rims and spacing means on said wheel body.

5. A dual demountable rim wheel comprising a wheel body having a circumferentially extending substantially radial shoulder, an annular spacer having axially spaced radially flexible rim seat portions tapered radially inwardly and axially away from each other and encircling said wheel body, said spacer also having axially spaced abutment surfaces, a pair of tire carrying rims axially abutting said abutment surfaces and having flared radially inner surfaces engaging said seat portions, said rims also having circumferentially extending substantially radial shoulders and being positioned on said wheel body with the shoulder of one rim against the shoulder of said wheel body, and clamping means on said wheel body abutting the shoulder of the other of said rims for securing said rims and spacer on said wheel body.

6. A spacer ring for a dual demountable rim wheel having an annular body, circumferentially spaced extensions at the ends of and in substantial alignment with said body, circumferentially spaced rim seat portions at the ends of said body and tapered away from each other and circumferentially spaced portions at the ends of said body and between said extensions and rim seat portions offset radially inwardly beyond said extensions and rim seat portions.

7. A spacer ring for a dual demountable rim wheel having an annular body, circumferentially spaced extensions at the ends of and in substantial alignment with said body, circumferentially spaced tapered rim seat portions at the ends of said body, circumferentially spaced portions at the ends of said body and between said extensions and rim seat portions offset radially inwardly beyond said extensions and rim seat portions and other circumferentially spaced tapered rim seat portions beyond the ends of said extensions and between said last mentioned portions.

8. A ring for securing a demountable rim on a wheel body having circumferentially spaced portions with substantially radial ends for abutting the rim, circumferentially spaced tapered rim seat portions for engaging a radially inner surface of the rim and other circumferentially spaced portions for engaging a radially outer surface of the wheel body, said two last mentioned portions yieldably supporting the rim on the wheel body.

9. A spacer ring for a dual demountable rim wheel having an annular body, circumferentially spaced extensions at the ends of and in substantial alignment with said body and circumferentially spaced rim seat portions at the ends of said body and radially offset from said extensions.

10. A demountable rim wheel comprising a wheel body having a circumferentially extending substantially radial shoulder, a tire carrying rim having a circumferentially extending substantially radial shoulder for abutting the shoulder of said wheel body, a circumferentially extending axially facing surface and a circumferentially extending radially inner surface flared in a direction away from the shoulder and toward the axially facing surface of the rim and means for clamping said rim to said wheel body comprising a member having a portion abutting the axially facing surface of said rim and a radially flexible portion between said wheel body and rim abutting the flared surface of said rim.

11. A demountable rim wheel comprising a wheel body having a circumferentially extending substantially radial shoulder, a tire carrying rim having a circumferentially extending substantially radial shoulder, a circumferentially extending axially facing substantially radial surface and a circumferentially extending radially inner surface, and means for securing said rim to said wheel body comprising a member having a portion abutting the axial facing surface of said rim and a portion between the radially inner surface of said rim and said wheel body yieldable radially to provide for abutment of said substantially radial shoulders and to carry the radial load.

12. A dual demountable rim wheel comprising a wheel body having a fixed substantially radial rim aligning shoulder, rim clamping means movable toward said shoulder and having a substantially radial face, a pair of tire carrying rims each having a substantially radial shoulder and an axially facing surface, and spacing means between said rims and wheel body having portions engaging the axially facing surfaces of said rims and radially flexible seat portions between and engaging said wheel body and rims, said spacing means clamping the shoulder of one of said rims against the fixed shoulder of said wheel body and positively aligning said last mentioned rim at right angles to the axis of the wheel, said spacing means also positively axially positioning and aligning at right angles to the axis of said wheel the other of said rims.

13. A dual demountable rim wheel comprising a wheel body having a fixed substantially radial rim aligning shoulder, rim clamping means movable towards said shoulder and having a substantially radial face, a pair of tire carrying rims each having a substantially radial shoulder, an axially facing substantially radial surface and a flared radially inner surface between the shoulder and the axially facing surface, and spacing means between said rims and wheel body having portions engaging the axially facing surfaces of said rims and radially flexible portions between and engaging said wheel body and the flared radially inner surfaces of said rims, said spacing means clamping the shoulder of one of said rims against the fixed shoulder of said wheel body and also axially positioning the other of said rims relative to said wheel body.

CHARLES W. SINCLAIR.

REFERENCES CITED

The following references are of record in the file of this patent:

UNITED STATES PATENTS

| Number | Name | Date |
|---|---|---|
| 1,419,170 | Putnam | June 13, 1922 |
| 2,309,573 | Burger | Jan. 26, 1943 |

FOREIGN PATENTS

| Number | Country | Date |
|---|---|---|
| 691,292 | France | Oct. 20, 1930 |